Oct. 22, 1929.   G. S. BRATTON   1,732,921
PROCESS FOR AEROBIC FERMENTATION
Filed March 6, 1926
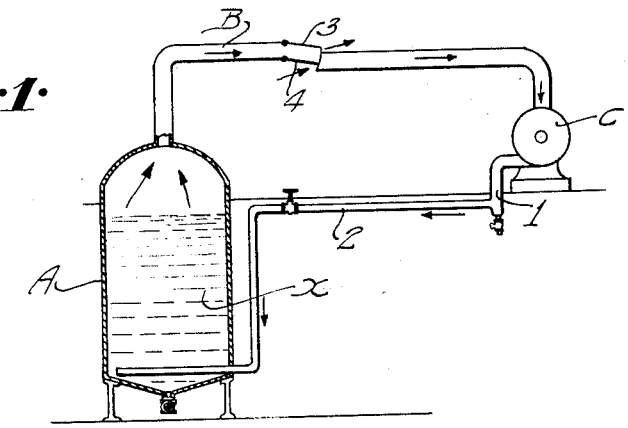
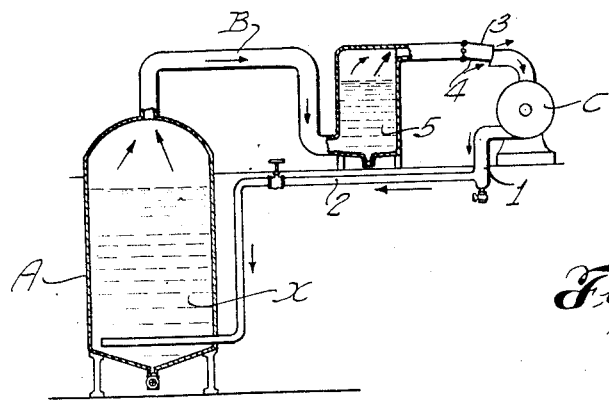
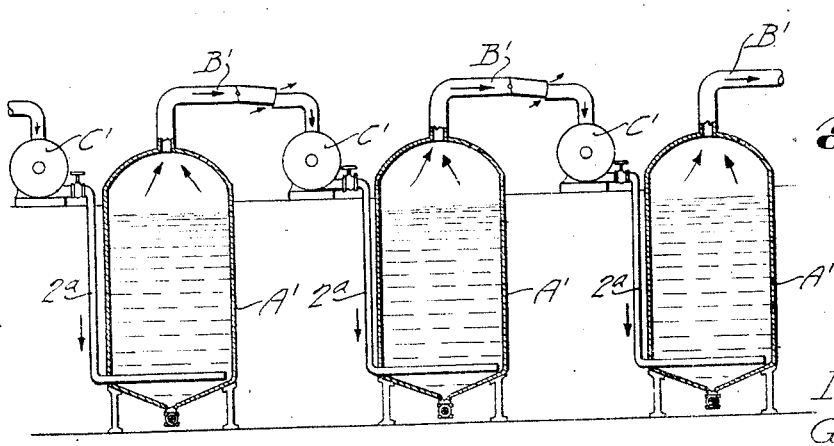
INVENTOR
G. S. Bratton
By Bakewell & Church
ATTORNEYS Patented Oct. 22, 1929

1,732,921

UNITED STATES PATENT OFFICE

GEORGE S. BRATTON, OF ST. LOUIS, MISSOURI, ASSIGNOR TO ANHEUSER-BUSCH, INCORPORATED, OF ST. LOUIS, MISSOURI, A CORPORATION OF MISSOURI

PROCESS FOR AEROBIC FERMENTATION

Application filed March 6, 1926. Serial No. 92,958.

This invention relates to processes of the kind that are used in aerobic fermentation.

In the conventional process of aerobic fermentation such as is used in the manufacture of yeast and vinegar, the air, after acting on the material in the fermenting vat or generator, is allowed to escape into the atmosphere. Due to the fact that the escaping air carries away appreciable quantities of valuable food materials or products of fermentation, such as alcohols, organic acids and esters, the conventional process of aerobic fermentation is wasteful, inefficient and expensive. Moreover, as the actual amount of oxygen taken out of the air during its passage through the fermenting vat is very small, a relatively great quantity of air has to be used in the conventional process of aerobic fermentation to produce aeration of a comparatively small quantity of material. For example, in a yeast growing vat of approximately 10,000 gallons capacity it is the usual practice to pass as much as 1,000,000 cubic feet of air through the vat in the course of the growth of a single batch or crop of yeast of 15 hours' duration. Accordingly, approximately 70,000 lbs. of air is required to produce fermentation of approximately 3,000 lbs. of yeast. While aeration is essential to obtain a high yield of yeast, the very excessive aeration partly defeats its own purpose, in that the more violent the aeration, the greater is the loss of volatile materials which are capable of serving as food for the yeast. In like manner in vinegar generators where practically all of the food as well as the end products of fermentation are volatile, excessive aeration partly defeats its own purpose.

The main object of my invention is to provide a process for aerobic fermentation in which the volatile products that are carried out of the fermenting vat or generator with the escaping air are conserved.

Another object of my invention is to provide a process for aerobic fermentation that consumes materially less air than is used in conventional aerobic processes of fermentation to aerate the material, due to the fact that the same stream of air or practically the same stream of air is used a plurality of times for aerating purposes.

The chief object of aeration in the fermenting industries is to supply oxygen to the growing organisms in a sufficient quantity to produce the desired end products, such, for instance, as acetic acid, in the manufacture of vinegar, or to produce luxurious growth of yeast in the manufacture of yeast. My process insures sufficient oxygen to supply the physiological requirements for producing the desired results; it insures the utilization or recovery of valuable materials, which in the conventional process of aerobic fermentation, are allowed to go to waste; and it also contemplates the removal from the respired air of carbon dioxide or other gases which might produce a deleterious effect when present in excessive quantities.

Briefly stated, my process consists in causing the air which escapes from a fermenting vat or generator after aerating the substance in same, to be subjected to such treatment as to conserve, recover or utilize volatile products carried out of the vat by the escaping air. My process can be practised or carried out in various ways without departing from the spirit of my invention. For example, the air that is supplied to a fermenting vat or generator to aerate the substance therein can be allowed to escape from the vat into a circulating system which returns said air to the vat from which it was withdrawn or to a different vat that contains a substance which requires aeration, the volatile products carried by the escaping air being used for food by the fermenting organisms in the second passage or subsequent passages of the air through the substance undergoing fermentation. Another way of carrying out my invention is to cause the air that escapes from a fermenting vat or generator after aerating the substance in same to be acted upon by a re-agent or medium which effects the absorption of the volatile constituents in the escaping air.

A relatively small percentage of the oxygen in the air is absorbed by the fermenting substance in the vat each time the air passes through the vat so that it is practicable to use the same stream of air a plurality of times for aerating purposes, but instead of re-using the air by re-circulation or by passing the air from one vat to another until all of the oxygen in the air has been absorbed, it is preferable in those types of fermentation that have a high oxygen requirement to permit a portion of the exhaled air to escape from the circulating system and cause a quantity of fresh air to enter said system, so as to replenish the oxygen consumed in the passage of the air through the vat. In other words, the circulating system does not have to be air-tight. In fact, since fermentation itself generates a certain amount of gas, the circulating system should preferably be constructed so as to allow for the escape or absorption of this excess gas and the admission into the circulating system of sufficient oxygen to meet the requirements for the needs at hand.

In case it is desired to absorb certain fractions of the circulating gases and vapors contained in the air by a means other than the growing medium contained in the fermenting vat itself, absorbing towers or vats may be incorporated into the circulating system and equipped with reagents for effecting the absorbtion of the particular material or materials which it is desired to remove or recover. For instance, the carbon dioxide in the air may be absorbed by a solution or spray of alkaline hydroxides or the aldehydes, in the air may be absorbed by sulphite solutions. Likewise, other substances in the air which it is desired to remove or recover can be absorbed by suitable absorbing agents. In instances where a portion of the exhaust air is allowed to escape from the circulating system and in instances where absorbing agents are used to remove the volatile materials carried by the exhaust air, fresh air is preferably introduced into the circulating system to replace the amount of air that is permitted to escape from the system or to replace the volatile materials absorbed from the exhaust air.

Figure 1 of the drawings is a diagrammatic view of an apparatus for practicing my process, constructed so as to cause the air that escapes from a fermenting vat, after aerating the substance in same, to be re-introduced into said vat and again used for aerating said substance.

Figure 2 is a diagrammatic view of an apparatus of the kind shown in Figure 1 equipped with means for absorbing volatile materials carried out of the vat by the escaping air; and Figure 3 is a diagrammatic view of an apparatus for practicing my process and composed of a plurality of fermenting vats arranged in series in a system through which the air circulates from one vat to another.

Referring to Figure 1 of the drawings, A designates a fermenting vat or generator that contains a fermenting solution $x$ which is adapted to be aerated by air that is passed through said solution preferably upwardly through the same, B designates an air discharge pipe forming part of a circulating system and leading from the upper end of the vat so as to permit the air to escape from the vat after passing through the solution $x$ in same, and C designates an areator, such as an ordinary blower or compressor whose inlet is connected to the air discharge pipe B and whose outlet 1 is connected by means of an air return pipe 2 with the lower end of the vat A, thereby producing a closed circulating system through which the air that escapes from the vat A through the discharge pipe B is returned to the lower end of said vat and used again for aerating the solution $x$ in same. Unless the air circulating system is extremely large in proportion to the volume of the fermenting vat or generator A, an air outlet 3 and an air intlet 4 should preferably be provided in said system so that any desired portion of the exhaust air may be permitted to escape from the system and fresh air taken into the system in a sufficient quantity to maintain equilibrium. The rate of aeration and the quantity of fresh air admitted to the air circulating system should be governed by the type of fermentation and the results desired. For instance, in the case of alcoholic fermentation where the object is to produce a large quantity of alcohol and a relatively small quantity of yeast, the apparatus may be operated on slow aeration, with little if any intake of oxygen into the circulating system, and only sufficient outlet of gases from said system to maintain equilibrium. If in a yeast growing fermentation, where a very high yield of yeast is desired, with little or no residue of alcohol, the apparatus should be operated on strong aeration, with a more liberal outlet and intake of air to the circulating system. If, in the case of vinegar generators, where the object is to conserve as much as possible the volatile acids, alcohols and esters and at the same time supply sufficient oxygen for the vinegar bacteria to oxidize the alcohol, the rate of recirculation and the quantity of the oxygen in the system should be sufficient to keep the generators working normally, with little or no alcohol in the finished product. In any case, accurate control should be maintained by chemical and bacteriological tests, in order to insure the proper balance between rate of aeration and the end product desired.

The apparatus illustrated in Figure 2 is similar to the apparatus illustrated in Figure 1, except that the air circulating system is equipped with a means 5 for effecting fractional absorption of certain gases or vapors that are carried out of the fermenting vat A with the escaping air. The means 5 just referred to may consist of a solution or spray of lime water or other alkaline hydroxide solution in instances where it is desired to absorb the carbon dioxide contained in the volatile material that is carried out of the vat or generator A with the escaping air. In case acetaldehyde is present in the volatile products that are carried out of the generator with the escaping air, the acetaldehyde may be absorbed in fixing reagents, such as the sulphites of sodium, potassium or calcium. Accordingly, in an apparatus of the kind shown in Figure 2 the air that escapes from the vat or generator can be freed of different gases or vapors it may be desired to remove and at the same time sufficient air introduced into the circulating system through the air inlet 4 to maintain equilibrium.

The apparatus illustrated in Figure 3 comprises a plurality of generators or fermenting vats A' arranged in series in an air circulating system, the air discharge pipe B' that leads from the upper end of each generator being connected to the intake of an aerator C' whose discharge is connected by a pipe 2ª to the succeeding generator or fermenting vat of the series. If desired, air outlets and inlets 3 and 4 can be arranged in the circulating system between each fermenting vat and the succeeding aerator so as to permit a portion of the air to escape from the system and a like quantity of fresh air admitted to the system.

While I have herein illustrated three types of apparatus that may be used to effect the conservation of the volatile products of aerobic fermentation, it will, of course, be understood that various other kinds of apparatus may be used to practice or carry out my process.

Having thus described my invention, what I claim as new and desire to secure by Letters Patent is:

1. A process of aerobic fermentation, which consists in causing material to ferment, causing a stream of air to pass a plurality of times through the material that is undergoing fermentation, and supplying fresh air to said stream at such a rate as to compensate for the oxygen that is consumed each time said stream of air passes through the fermenting material.

2. A process of aerobic fermentation, which consists in causing material to ferment in a vat or generator, causing a stream of air to circulate through the fermenting material in said vat, over and over again, for the purpose described, permitting a portion of the exhaust air to escape from the circulating stream, and admitting to said circulating stream fresh air to compensate for the oxygen consumed during the passage of the stream through the fermenting material.

3. A process of aerobic fermentation, which consists in causing material to ferment in a vat or generator, causing a stream of air to circulate through the fermenting material in said vat over and over again, permitting some of the exhaust air to escape continuously from the circulating stream and continuously admitting to said circulating stream fresh air, in a quantity substantially equal to the escaping exhaust air, so as to compensate for the oxygen that is consumed during the passage of the stream through the fermenting material.

GEORGE S. BRATTON.